G. W. ALLEN.
MACHINE FOR MAKING AND DISTRIBUTING FERTILIZER.
APPLICATION FILED SEPT. 6, 1912.
1,053,467.
Patented Feb. 18, 1913.
2 SHEETS—SHEET 1.
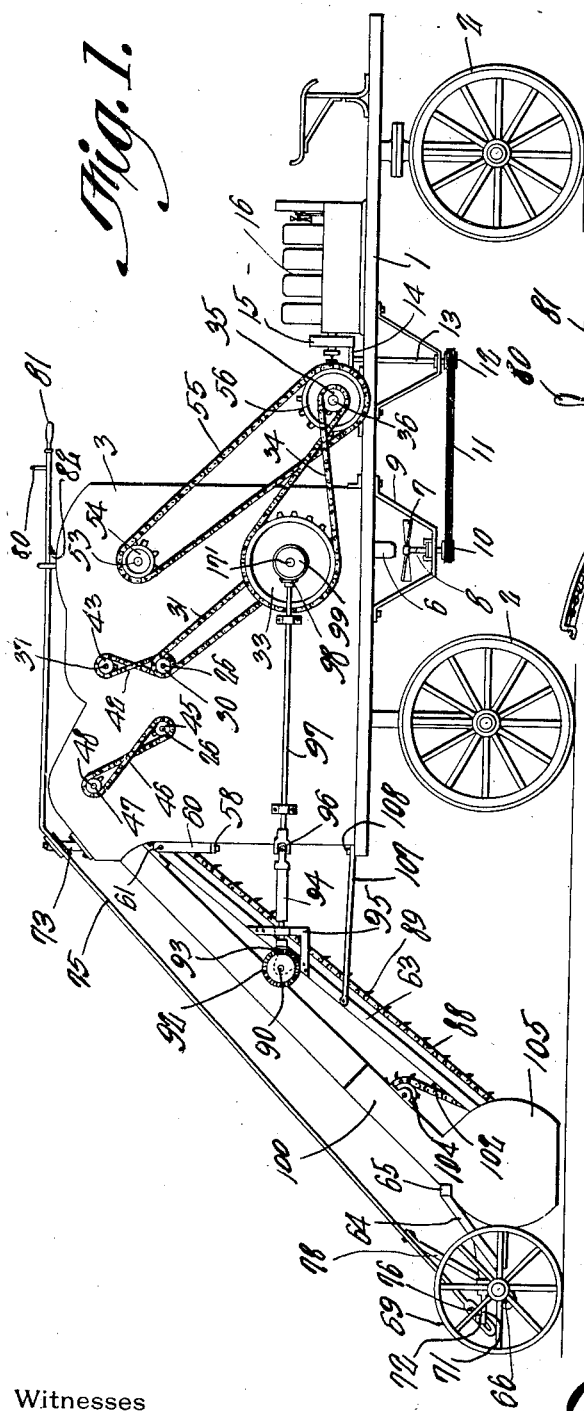
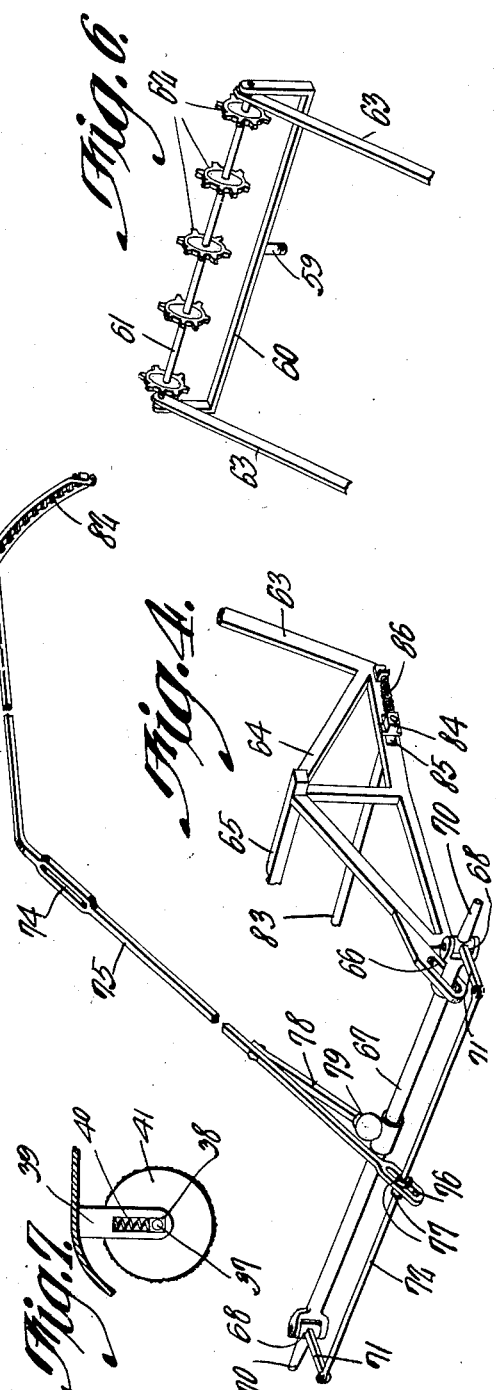
Witnesses
George W. Allen, Inventor
by C. A. Snow & Co., Attorneys G. W. ALLEN.
MACHINE FOR MAKING AND DISTRIBUTING FERTILIZER.
APPLICATION FILED SEPT. 6, 1912.
1,053,467.
Patented Feb. 18, 1913.
2 SHEETS—SHEET 2.
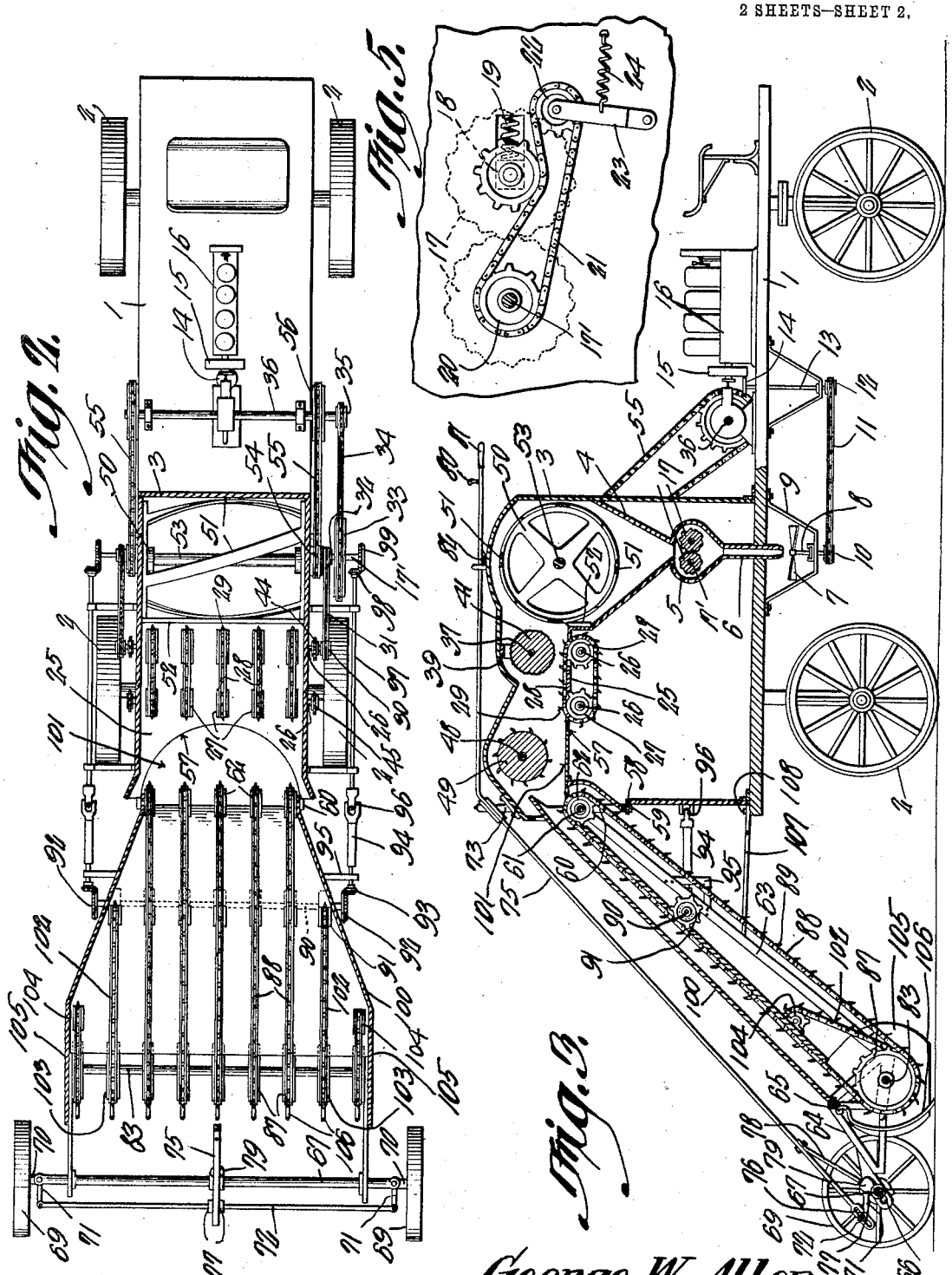
George W. Allen, Inventor
by C. A. Snow & Co., Attorneys
Witnesses

UNITED STATES PATENT OFFICE.

GEORGE WILLIAM ALLEN, OF SELMA, CALIFORNIA.

MACHINE FOR MAKING AND DISTRIBUTING FERTILIZER.

1,053,467.  Specification of Letters Patent.  Patented Feb. 18, 1913.

Application filed September 6, 1912. Serial No. 719,030.

*To all whom it may concern:*

Be it known that I, GEORGE W. ALLEN, a citizen of the United States, residing at Selma, in the county of Fresno and State of California, have invented a new and useful Machine for Making and Distributing Fertilizer, of which the following is a specification.

This invention relates to machines for gathering brush such as found in large quantities in orchards, and for reducing the brush to a finely comminuted state after which the machine discharges the product broadcast for use in fertilizing the soil.

A further object is to provide a machine of this type which is compact in construction and can be easily controlled, the brush gathering means being movable into and out of active position and being shiftable from one side to the other as desired.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the complete machine. Fig. 2 is a plan view thereof, the casings being shown in section. Fig. 3 is a central vertical longitudinal section through the machine. Fig. 4 is a perspective view of the controlling lever and of a portion of the frame. Fig. 5 is an enlarged elevation of a portion of the mechanism used in connection with the feed rolls. Fig. 6 is a perspective view of the upper shaft of the elevator and adjacent parts. Fig. 7 is an enlarged view showing in end elevation, one of the feed rolls used in connection with the feed apron.

Referring to the figures by characters of reference 1 designates the body of the machine, the same being supported by wheels 2 and being adapted to be propelled in any suitable manner. Mounted on the back portion of this body is a casing 3 having a hopper 4 in the front portion thereof and which discharges downwardly into a housing 5. A discharge tube 6 extends downwardly from this housing and its open end is located directly above the center of a fan 7 which is mounted to rotate in a horizontal plane under the body 1. This fan is secured to a vertical shaft 8 journaled within a bracket 9 depending from body 1 and a sprocket 10 is secured to the shaft and receives motion, through a chain 11, from another sprocket 12 secured to a shaft 13. This last named shaft is arranged vertically within and below the body 1 and has a friction disk 14 which engages a wheel 15 driven by a suitable motor 16. It is to be understood of course that any other suitable means may be employed for transmitting motion to the shaft 13 from the motor.

Mounted for rotation within the housing 5 are opposed corrugated feed rolls 17, one of these rolls being journaled in slidable bearing boxes 18 having springs 19 pressing thereagainst. The two rolls are thus held constantly pressed together. A sprocket 20 rotates with each of the rolls 17 and these sprockets are engaged by an endless chain 21 which is mounted on an idler sprocket 22. This idler sprocket is carried by a lever 23 and a spring 24 is attached to the lever so as to hold the chain taut under all conditions. By referring to Fig. 5 it will be seen that the chain is so arranged relative to the sprocket as to cause the feed rolls 17 to rotate in opposite directions.

A horizontal partition 25 extends from the back end of the casing 3 up to the back wall of the hopper 4 and arranged under this partition are spaced shafts 26 having sprockets secured thereto, as shown at 27, these sprockets being engaged by endless chains 28 having outstanding teeth 29. The upper flights of the chains are disposed above the partition 25 so that the teeth thereon are free to engage the material located on the partition. One of the shafts 26 has a sprocket 30 secured to one end thereof and this sprocket receives motion through a chain 31, from another sprocket 32 secured to the shaft of one of the feed rolls 17, the shaft of said roll being indicated at 17'. A large sprocket 33 is secured to this shaft 17' and receives motion, through a chain 34, from a sprocket 35 secured to a shaft 36. This shaft may be actuated in any suitable manner, by the motor 16. As shown in Fig. 2, this mechanism may be duplicated so that the shafts 17' and 26 will be driven at both ends.

A shaft 37 is arranged in casing 3 between partition 25 and the top of the casing, this shaft being preferably journaled in slidable bearings 38 which are mounted in brackets 39. Springs 40 bear against the bearings so as to hold the shaft normally pressed downwardly toward the chains 28. A feed roll 41 is secured to the shaft 37 and is preferably provided with a corrugated peripheral portion. Shaft 37 is preferably driven by means of a chain 42 mounted on sprockets 43 and 44 which are secured to the shafts 37 and 26 respectively. The other shaft 26 has a sprocket 45 secured thereto and which transmits motion, as through a chain 46, to another sprocket 47 secured to a transverse shaft 48. This last named shaft is located above the partition 45 and between the rear end of casing 3 and the shaft 37. A toothed feed roll 49 rotates with shaft 48.

Arranged within the casing 3 and above the hopper 4 is a cutting cylinder 50 having spirally arranged cutting blades 51 thereon adapted successively to contact with a fixed blade 52. This fixed blade is located within the hopper 4 at the front end of the partition 25 and material engaged by the toothed chains 28 is fed across this stationary knife 52 where it will be engaged by the blades 51. The shaft 53 of cylinder 50 has a sprocket 54, which receives motion through a chain 55, from another sprocket 56 secured to the transverse shaft 36.

The back end of the casing is open between the partition 25 and the top of the casing and the back end of the partition is formed with an arcuate recess 57. A bracket 58 extends rearwardly from casing 3 and journaled in this bracket is a stem 59 projecting downwardly from a yoke-like frame 60. A shaft 61 is journaled in this yoke and has sprockets 62 secured thereto. Side strips 63 are pivotally mounted at their upper ends upon the end portions of shaft 61 and these strips inclined downwardly and rearwardly and are provided, at their lower ends, with frames 64 connected by a cross strip 65. The rear end of each frame has an inclined slot 66 therein and in which an axle 67 is mounted to slide. Knuckles 68 are connected to the ends of the axle and supporting wheels 69 are journaled on the spindles 70 which extend from these knuckles. Rearwardly extending arms 71 project from the knuckles and the two arms are connected by a rod 72 whereby the spindles 70 are caused to swing together so that the wheels 69 can be used for steering the gathering mechanism in the manner hereinafter described.

A pivot stud 73 is arranged on the casing 3 in vertical alinement with the stem 59 and this stud is engaged by the longitudinally slotted portion 74 of a controlling lever 75. Said lever is inclined downwardly and has its rear or lower end slotted longitudinally as at 76 and mounted on the rod 72. Collars 77 are arranged on the rod 72 at opposite sides of lever 75 so that, while the lever is free to slide upwardly and downwardly on the rod 72, any lateral movement of the lever will produce a corresponding movement of the rod 72. A link 78 is loosely connected to the lever 75 and is connected, preferably by means of a universal joint 79, to the middle portion of the axle 67. Thus it will be seen that when the lever 75 is raised or lowered, the axle 67 will be moved therewith and caused to travel in the slot 66. However, during lateral movement of lever 75, the link 78 will swing relative to the lever and there will be no corresponding movement of the axle 67.

Lever 75 extends forwardly over the casing 3, as shown in Fig. 1 and is provided with handles 80 and 81 at its front end whereby it can be readily manipulated. A toothed segment 82 may be mounted on the casing for engagement by the lever.

A shaft 83 is journaled at its ends in bearings 84 which are slidably mounted in slots 85 formed in the bottom portions of the frames 64. Springs 86 serve to bear against the bearings 84 so as to press the shaft 83 rearwardly. This shaft has a series of large sprockets 87 secured thereto and said sprockets are engaged by endless chains 88 which extend upwardly between the side strips 63 and engage the sprockets 62. Each chain has a plurality of outstanding teeth 89.

A shaft 90 is journaled upon the side strips 63 and has sprockets 91 thereon which engage the upper flights of the chains 88. This shaft 90 has a bevel gear 92 at each end thereof. Each of these bevel gears meshes with another bevel gear 93 secured to one end of a telescopic shaft 94. Said shaft is journaled, adjacent one end, in a bracket 95 extending from the side strips 63. The other end of the telescopic shaft 94 is connected by a universal joint 96 to a shaft 97 journaled upon one side of the casing 3. A bevel gear 98 is secured to the shaft 97 and receives motion, through a gear 99, from the shaft 17'.

A casing 100 is supported by the side strips 63 and has its sides preferably diverging downwardly, as shown particularly in Fig. 2. The bottom of the casing is arranged between the upper and lower flights of the chains 88 and said bottom extends up to and over the shaft 61 and merges into a semi-circular bib 101 which fills and is adapted to rotate in the recess 57 in partition 25. As the rear end of the casing 100 is broader than the front or upper end thereof, additional elevating chains 102 are preferably arranged therein, these chains being driven by sprockets 103 on the shaft 83 and being mounted on idler sprockets 104 mounted within the bottom of the casing 100. The chains 102 are of course shorter than the chains 88. All of the chains 102 and 88 are parallel. The lower end of the casing 100 merges into a hood 105 which is open at the bottom and is normally supported close to the surface on which the machine is mounted. The hood is concentric with the sprockets 87 and spaced therefrom a sufficient distance to permit the teeth 89 to work freely between the sprockets and the hood. Spring rake teeth 106 extend downwardly from the cross strip 65 and project through the open bottom of the hood so as to engage the surface on which the machine is mounted.

A V-shaped draw member or coupling 107 is fixedly connected to the sides of casing 100 and detachably engages a pivot pin 108 on the body 1 and in vertical alinement with stem 59 and stud 73.

When the machine is not to be used for gathering brush, the coupling member 107 is disengaged from the pin 108 and lever 75 is shifted rearwardly, its lower end being guided by the rod 72. Link 78 thus pushes the axle 67 longitudinally within slots 66 and causes the frames 64 to elevate and lift the teeth 106 out of contact with the surface on which the machine is mounted. By swinging the lever to one side or the other, the rod 72 can be caused to shift the spindles 70 so that the wheels 69 will cause the side strips 63 and the parts carried thereby to swing laterally in either direction and about the axis of the stem 59. This operation can be carried out whether or not the teeth 106 are in engagement with the ground. When it is desired to use the machine for gathering brush and reducing it to a finely comminuted state, the lever 75 is drawn forward so as to seat the axle 67 in the upper ends of the slots 66, thus permitting the hood 105 to swing downward about the shaft 61 as an axis. Thus teeth 106 come into engagement with the ground and operate to engage any brush which may be in the path thereof. The machine is now drawn forward in any suitable manner and the mechanism is driven by the motor 16. As the machine moves along, any brush in the path thereof will be collected by the teeth 106 and brought into the path of the teeth 89 on chains 88 and 102. The brush will thus be carried upwardly within the hood 105 and onto the upper surface of the casing bottom. The brush will thus be drawn along the bottom of the casing and will be discharged onto the bib 101 where it will be engaged by the feed roll 49 and forced onto the toothed chains 28. These chains, in turn, carry the brush under the feed roll 41 and said roll and chains coöperate to force the brush over the fixed blade 52 and into the path of the rapidly rotating cutting blades 51. The material, as it is thus fed to the cutting cylinder 50, is obviously quickly reduced to a finely comminuted state, and the pulverized material dropped into the hopper 4 from which it is fed onto the feed rolls 17. These rolls feed the material downwardly into the discharge tube 6 and from this tube the material is dropped onto the center of the rotating fan 7. Said fan scatters the material broadcast and it will, obviously, form an efficient fertilizer when left to rot upon the ground.

What is claimed is:—

1. The combination with a wheel supported structure, coöperating cutting elements carried thereby, and means for scattering broadcast the material discharged from the cutting elements, of means mounted to swing laterally relative to said wheel supported structure for collecting and elevating brush to the cutting elements.

2. The combination with a wheel supported structure, coöperating cutting elements carried thereby, and means for scattering broadcast the material discharged from the cutting elements, of means connected to said structure and adapted to swing upwardly and downwardly and laterally relative to the structure for collecting brush and elevating it to the cutting elements.

3. The combination with a portable structure, of coöperating fixed and movable cutters thereon, means for collecting brush, means for conveying the brush to the cutters for reduction to a finely comminuted state, a revoluble horizontal fan, and means for directing the finely comminuted material onto the center of the fan for broadcast distribution in all directions, said collecting and conveying means being mounted for up and down and lateral movement relative to the portable structure.

4. The combination with a portable structure, of a casing mounted to swing upwardly and downwardly and laterally relative to said structure, said casing including a hood at one end, steering and supporting wheels, connections between said wheels and the casing, means for shifting the steering wheels, brush collecting means in the hood, brush elevating means within the hood and casing, means for reducing brush to a finely comminuted state, means for directing brush from said elevating means to the reducing means, and means for scattering broadcast the finely comminuted material.

5. The combination with a portable structure, and means for collecting and conveying brush, of coöperating cutting elements, means for directing brush from said conveying means to the cutting elements, a discharge tube, feed rolls thereabove, means for directing the finely comminuted material from the cutting elements and onto the feed rolls, a fan adapted to rotate in a horizontal plane to scatter the finely comminuted material broadcast, said discharge tube being adapted to direct the material onto the center of the fan.

In testimony that I claim the foregoing as my own, I have hereto affixed my signature in the presence of two witnesses.

GEORGE WILLIAM ALLEN.

Witnesses:
A. M. DOWNING,
N. LINDSAY SOUTH.